United States Patent
Julien et al.

(10) Patent No.: US 10,752,129 B2
(45) Date of Patent: Aug. 25, 2020

(54) BATTERY HEATING IN HYBRID ELECTRIC POWER PLANT

(71) Applicant: PRATT & WHITNEY CANADA CORP., Longueuil (CA)

(72) Inventors: Andre Julien, Ste-Julie (CA); Serge Dussault, Ste-Julie (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 0 days.

(21) Appl. No.: 16/171,473

(22) Filed: Oct. 26, 2018

(65) Prior Publication Data
US 2020/0130534 A1    Apr. 30, 2020

(51) Int. Cl.
| | |
|---|---|
| *B60L 58/27* | (2019.01) |
| *B64D 27/02* | (2006.01) |
| *F01P 3/12* | (2006.01) |
| *F01P 3/20* | (2006.01) |
| *F01M 5/00* | (2006.01) |
| *F01M 1/02* | (2006.01) |
| *H01M 10/663* | (2014.01) |
| *H01M 10/6568* | (2014.01) |
| *H01M 10/615* | (2014.01) |
| *H01M 10/625* | (2014.01) |
| *H01M 10/613* | (2014.01) |
| *F02B 37/00* | (2006.01) |

(52) U.S. Cl.
CPC .............. *B60L 58/27* (2019.02); *B64D 27/02* (2013.01); *F01M 1/02* (2013.01); *F01M 5/002* (2013.01); *F01P 3/12* (2013.01); *F01P 3/20* (2013.01); *H01M 10/613* (2015.04); *H01M 10/615* (2015.04); *H01M 10/625* (2015.04); *H01M 10/6568* (2015.04); *H01M 10/663* (2015.04); *B60L 2200/10* (2013.01); *B64D 2027/026* (2013.01); *F02B 37/00* (2013.01)

(58) Field of Classification Search
CPC .. B60L 58/27; B60L 2200/10; H01M 10/613; H01M 10/615; H01M 10/625; H01M 10/6568; H01M 10/663; B64D 27/02; B64D 2027/026; F01M 1/02; F01M 5/002; F01P 3/12; F01P 3/20; F02B 37/00
See application file for complete search history.

(56) References Cited

U.S. PATENT DOCUMENTS

| | | | |
|---|---|---|---|
| 6,394,210 B2 * | 5/2002 | Matsuda | B60H 1/00278 180/68.1 |
| 7,273,120 B2 * | 9/2007 | Tabata | B60K 6/365 180/65.265 |
| 7,769,505 B2 * | 8/2010 | Rask | B60L 58/12 701/22 |
| 8,141,360 B1 | 3/2012 | Huber | |
| 10,286,897 B2 * | 5/2019 | Ries-Mueller | B60W 10/06 |

(Continued)

OTHER PUBLICATIONS

European Search Report issued in corresponding EP application 19205741 dated Mar. 23, 2020.

*Primary Examiner* — Bryan A Evans
(74) *Attorney, Agent, or Firm* — Norton Rose Fulbright Canada LLP

(57) ABSTRACT

A method of operating a hybrid electric power plant in cold climates comprises absorbing heat generated by an internal combustion engine, and using at least part of the heat absorbed from the internal combustion engine to warm a battery pack operatively connected to an electric motor.

15 Claims, 4 Drawing Sheets

(56) References Cited

U.S. PATENT DOCUMENTS

| | | | |
|---|---|---|---|
| 2005/0167169 A1* | 8/2005 | Gering | B60L 58/26 237/12.3 B |
| 2011/0232890 A9* | 9/2011 | Gering | B60K 11/02 165/202 |
| 2012/0168111 A1* | 7/2012 | Soukhojak | F28D 20/023 165/10 |
| 2013/0059191 A1* | 3/2013 | Hirota | H01M 10/613 429/120 |
| 2014/0373533 A1 | 12/2014 | Jensen et al. | |
| 2015/0121939 A1* | 5/2015 | Takeuchi | F25B 13/00 62/324.6 |
| 2015/0191072 A1* | 7/2015 | Inoue | B60L 1/003 62/186 |
| 2015/0251518 A1* | 9/2015 | Nemesh | B60H 1/00764 165/202 |
| 2016/0229282 A1* | 8/2016 | Hettrich | B60H 1/00278 |
| 2016/0318499 A1* | 11/2016 | Yamanaka | B60H 1/00899 |
| 2017/0028813 A1* | 2/2017 | Enomoto | B60H 1/24 |
| 2017/0062886 A1 | 3/2017 | Bollman | |
| 2017/0077565 A1 | 3/2017 | Burrows et al. | |
| 2017/0284062 A1* | 10/2017 | Osaka | B60L 3/0046 |
| 2019/0136726 A1* | 5/2019 | Slesinski | F16H 57/0457 |

\* cited by examiner

BATTERY HEATING IN HYBRID ELECTRIC POWER PLANT

TECHNICAL FIELD

The application relates generally to hybrid electric power plants for aircraft applications and, more particularly, to a method and system for warming batteries in such power plants.

BACKGROUND OF THE ART

Temperature plays an important role in the performance of batteries. Batteries are a function of chemical reactions. In cold weather, the chemicals cannot react as fast as in warm weather. A cold battery will, thus, not have the same power as a warm one. In order to provide sufficient electrical power in all weather conditions, it is thus sometimes necessary to increase the number of batteries or use bigger batteries. However, this results in weight increase, which makes hybrid electric power plants less attractive for aircraft applications.

SUMMARY

In one aspect, there is provided a method of operating a hybrid electric power plant, the hybrid electric power plant having an internal combustion engine, an electric motor and a battery pack, the method comprising: a) absorbing heat generated by the internal combustion engine, and b) using the heat absorbed from the internal combustion engine to warm the battery pack.

In another aspect, there is provided a method of operating a hybrid electric power plant of an aircraft in cold climates, the method comprising: starting an internal combustion engine, circulating a coolant in heat exchange relationship with the internal combustion engine to absorb waste heat generated by the internal combustion engine, circulating the coolant heated by internal combustion engine in heat exchange relationship with a battery pack, the coolant transferring heat to the battery pack to warm the battery pack, and then using the battery pack to power an electric motor.

In a further aspect, there is provided a hybrid electric power plant comprising: a compressor; an internal combustion engine having an inlet fluidly connected to an outlet of the compressor, the internal combustion engine having a coolant circuit; a turbine having an inlet fluidly connected to an outlet of the internal combustion engine; an electric motor; and a battery pack configured to provide electric power to the electric motor, the battery pack in heat exchange relationship with the coolant circuit of the internal combustion engine.

DESCRIPTION OF THE DRAWINGS

Reference is now made to the accompanying figures in which.

DETAILED DESCRIPTION

Figure 1:
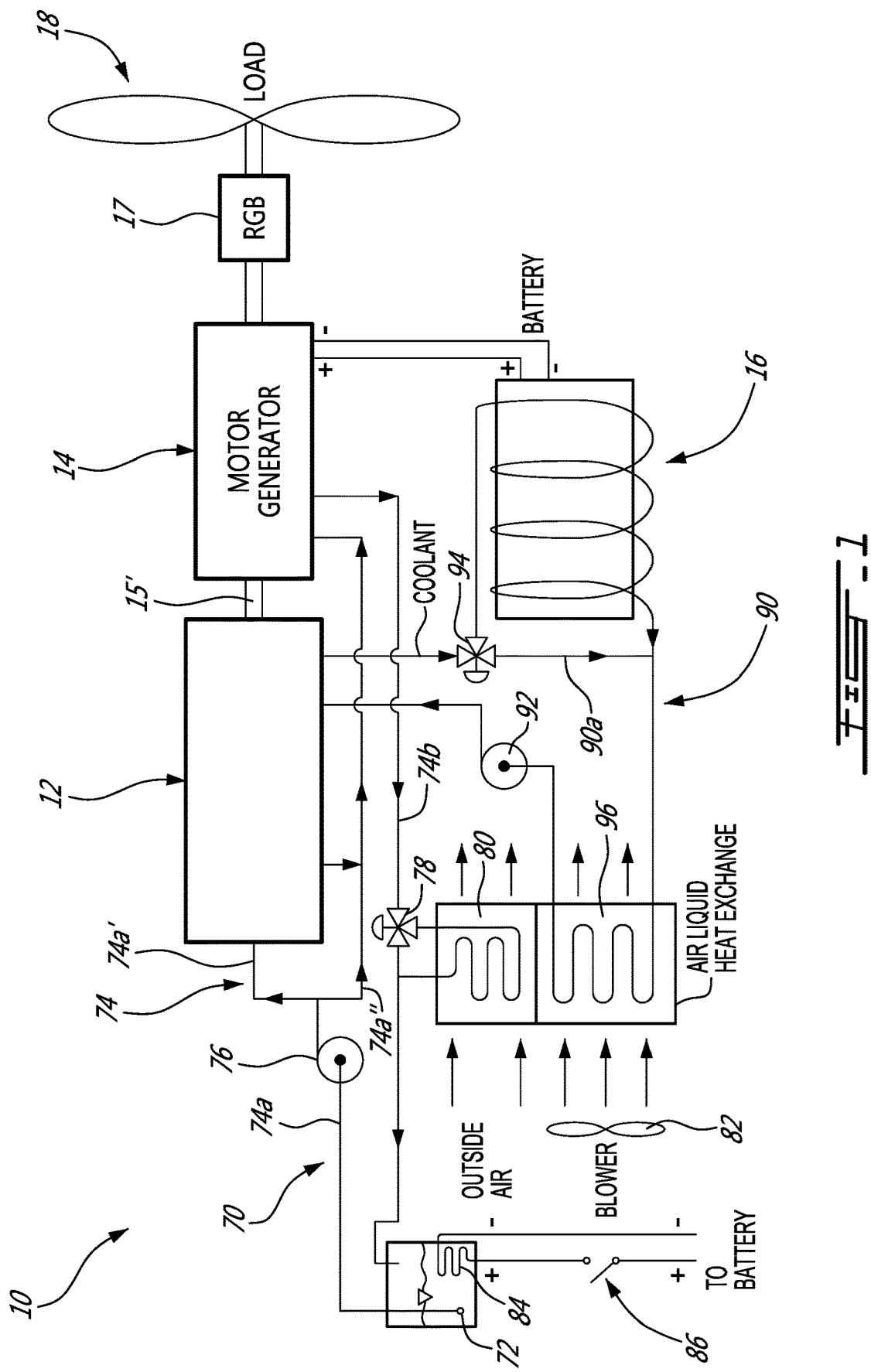
FIG. 1 is a schematic view of a power plant suitable for use on a hybrid electric aircraft.

FIG. 1 illustrates an example of a power plant 10 suitable for use on a hybrid electric aircraft. The power plant 10 can adopt various configurations. For instance, the power plant 10 could be configured as a turboprop engine for driving a propeller 18. According to another example, it can be configured as a turboshaft engine for driving a helicopter rotor or any other load to be driven. The hybrid electric power plant 10 could also be used in an auxiliary power unit (APU) installation. Other applications are contemplated as well.

According to a particular embodiment, the power plant 10 generally comprises a fossil-fuel powered engine 12 and an electric motor-generator 14 and a battery pack 16 electrically connected to the motor-generator 14. The motor-generator 14 can consist of two distinct motor and generator machines or it can be integrated into one unit. The engine 12 can be drivingly connected to the electric motor-generator 14 via output shaft 15'. The electric motor-generator 14 is, in turn, drivingly connected to a load (propeller 18 in the illustrated example) via a reductions gearbox (RGB) 17. According to one possible arrangement, the fossil-fuel powered engine 12 and the motor-generator 14 could be both connected to the RGB 17 to drive the load. Such an arrangement is referred to as a parallel hybrid system. According to another possible arrangement, the engine 12 could only be used to drive the motor-generator 14 when used in a generator mode for charging the batteries of the battery pack 16, and the load could only be driven by the electric motor 14 via the RGB 17. This arrangement can be referred to as a series hybrid system.

The engine 12 may be provided in the form of a conventional internal combustion engine (e.g. a piston or rotary engine) or in the form of a compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein.

Figure 2:
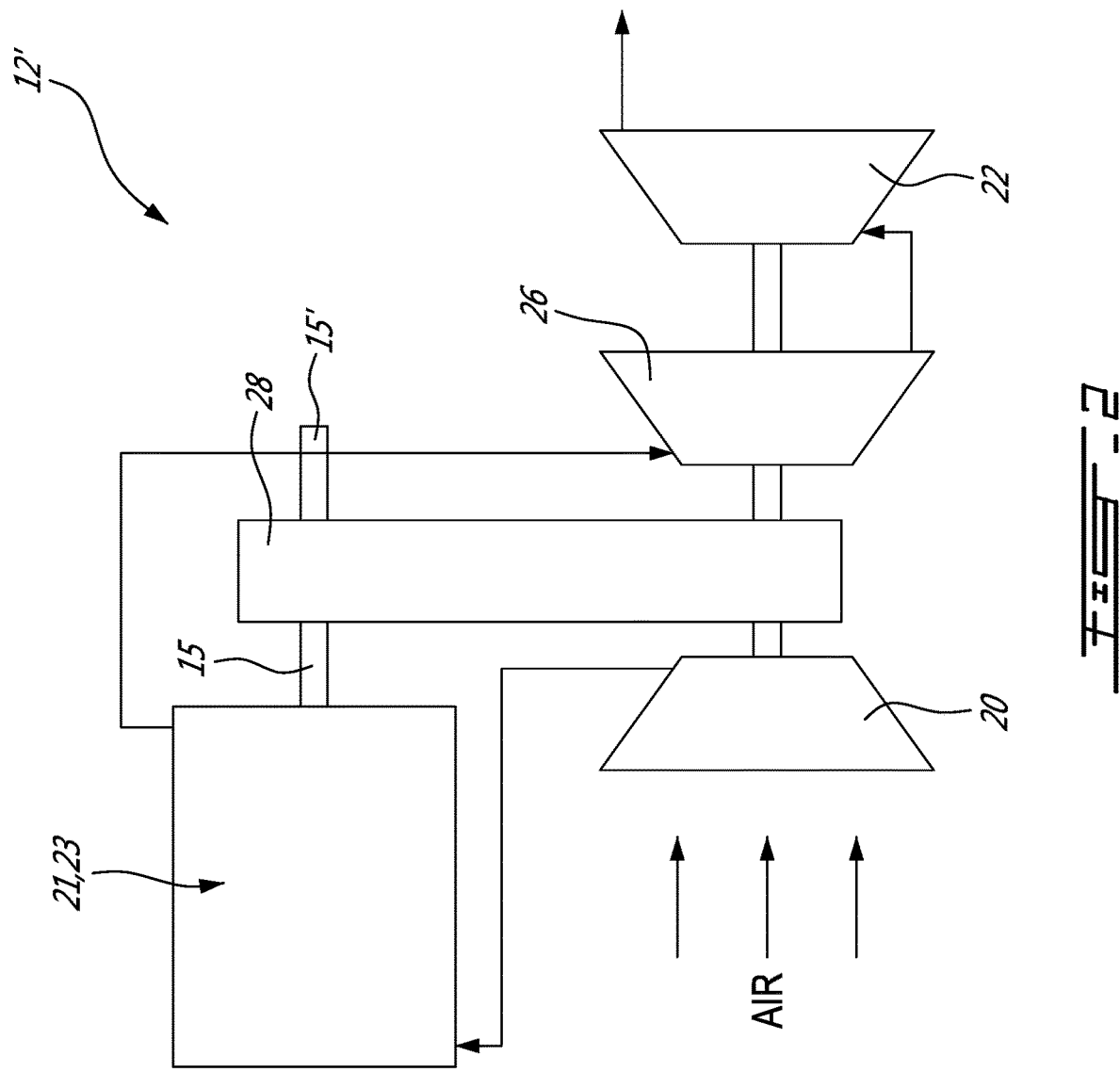
FIG. 2 is a schematic view of a compound cycle engine suitable for use in the power plant shown in FIG. 1.

FIG. 2 illustrates an example of a compound cycle engine 12' suitable for use as engine 12 in FIG. 1. The compound cycle engine 12' generally includes a supercharger compressor 20 for compressing the air prior to feeding an engine core 21 including one or more internal combustion engines 23. The exhaust from the engine core 21 is fed to one or more turbines 26, 22 of a compounding turbine section having an outlet fluidly connected to an exhaust duct for discharging the hot combustion gases to atmosphere. One or more of the turbines 26, 22 is/are configured to compound power with the engine core 21. In the embodiment shown, the turbine and engine shafts are coupled through a transmission provided by a gearbox 28. The compressor 20 may be driven by the turbines 26, 22 and/or the engine core 21. In the embodiment shown, the compressor 20 is driven by the turbines 26, 22, for example by being coupled to the same shaft or being engaged to the turbine shaft through a transmission provided in the gearbox 28. In another particular embodiment, the shaft of the compressor 20 is engaged to the output shaft of the engine core 21, either directly or through a transmission.

In a particular embodiment, the internal combustion engine(s) 23 of the engine core 21 is/are rotary intermittent internal combustion engines, for example Wankel engines; it is however understood that other types of intermittent internal combustion engines or other types of internal combustion engines may alternately be used.

Figure 3:
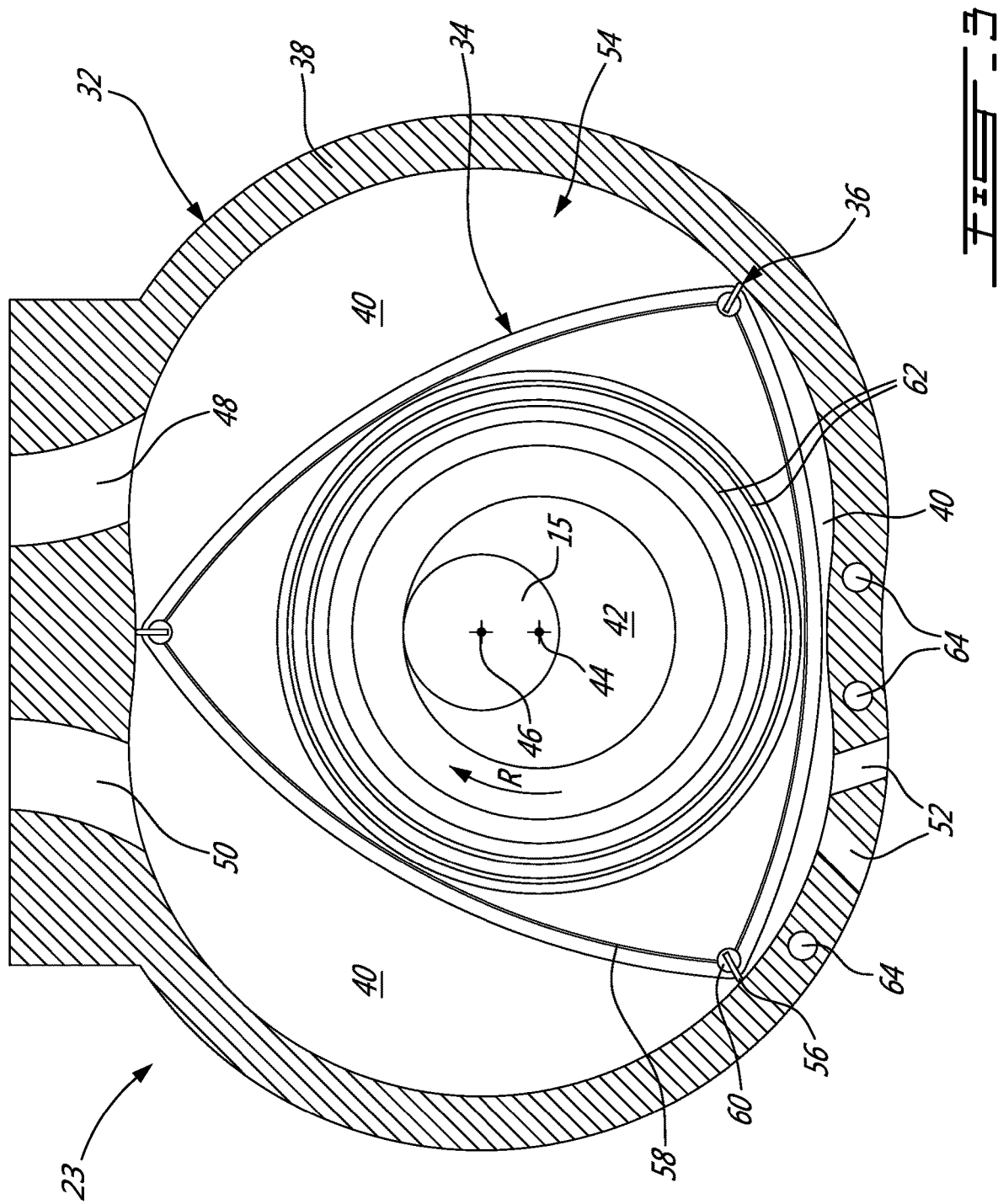
FIG. 3 is a schematic cross-sectional view of a rotary engine suitable for use in the compound cycle engine shown in FIG. 2.

As shown in FIG. 3, the exemplary engine 23 comprises a housing 32 defining a rotor cavity having a profile defining two lobes, which is preferably an epitrochoid. A rotor 34 is received within the rotor cavity. The rotor defines three circumferentially-spaced apex portions 36, and a generally triangular profile with outwardly arched sides. The apex portions 36 are in sealing engagement with the inner surface of a peripheral wall 38 of the housing 32 to form and separate three working chambers 40 of variable volume between the rotor 34 and the housing 32. The peripheral wall 38 extends between two axially spaced apart end walls 54 to enclose the rotor cavity.

The rotor 34 is engaged to an eccentric portion 42 of an output shaft 15 to perform orbital revolutions within the rotor cavity. The output shaft 15 performs three rotations for each orbital revolution of the rotor 34. The geometrical axis 44 of the rotor 34 is offset from and parallel to the axis 46 of the housing 32. During each rotation of the rotor 34, each chamber 40 varies in volume and moves around the rotor cavity to undergo the four phases of intake, compression, expansion and exhaust.

An intake port 48 is provided through the peripheral wall 38 for admitting compressed air into one of the working chambers 40. An exhaust port 50 is also provided through the peripheral wall 38 for discharge of the exhaust gases from the working chambers 40. Passages 52 for a spark plug, glow plug or other ignition mechanism, as well as for one or more fuel injectors of a fuel injection system (not shown) are also provided through the peripheral wall 38. Alternately, the intake port 48, the exhaust port 50 and/or the passages 52 may be provided through the end or side wall 54 of the housing. A sub-chamber (not shown) may be provided in communication with the chambers 40, for pilot or pre injection of fuel for combustion.

For efficient operation the working chambers 40 are sealed by spring-loaded peripheral or apex seals 56 extending from the rotor 34 to engage the inner surface of the peripheral wall 38, and spring-loaded face or gas seals 58 and end or corner seals 60 extending from the rotor 34 to engage the inner surface of the end walls 54. The rotor 34 also includes at least one spring-loaded oil seal ring 62 biased against the inner surface of the end wall 54 around the bearing for the rotor 34 on the shaft eccentric portion 42.

The fuel injector(s) of the engine 23, which in a particular embodiment are common rail fuel injectors, communicate with a source of Heavy fuel (e.g. diesel, kerosene (jet fuel), equivalent biofuel), and deliver the heavy fuel into the engine 23 such that the combustion chamber is stratified with a rich fuel-air mixture near the ignition source and a leaner mixture elsewhere.

As shown in FIG. 1, the power plant 10 also comprises a lubricant system 70 to provide lubricant to engine 12 and the electric motor-generator 14. The lubricant system generally comprises a tank 72 containing a predetermined volume of lubricant (e.g. oil), a lubricant circuit 74 fluidly connecting the tank 72 to engine 12 and the motor-generator 14, and a pump unit 76, which may comprises one or more pumps, for drawing lubricant from the tank 72 and moving the lubricant in a closed loop cycle through the lubricant circuit 74. For instance, the pump unit 72 can comprise a feed pump mounted in a feed line 74a of the oil circuit 74 between the tank 72 and the engine 12 and the motor-generator 14. The feed line 74a of the lubricant circuit 74 can have first and second branches 74a' and 74a" respectively fluidly connected to the engine 12 and the motor-generator 14. The feed pump 76 can be disposed upstream of the first and second branches 74a' and 74a". A three-way valve 78 or the like may be provided in a return line 74b of the lubricant circuit 74 downstream of the engine 12 and the motor-generator 14 to selectively cause the lubricant coming from the engine 12 and the motor-generator 14 to flow through a heat exchanger 80 before being returned into the tank 72 or to bypass the heat exchanger 80 and direct the lubricant directly back into the tank 72. According to the illustrated example, the heat exchanger 80 is an air-liquid heat exchanger. However, it is understood that other types of heat exchanger could be used. For instance, a liquid-to-liquid heat exchanger could be used to dissipate the heat pick up by the lubricant as it is circulated through the engine 12 and the motor-generator 14. In the case of an air-liquid heat exchanger, a blower 82 or other air flow inducing devices may be provided to generate a flow of cooling air through the heat exchanger 80 to cool the lubricant. According to a particular embodiment, the blower 82 may be disposed to draw outside air through an air duct in fluid communication with the heat exchanger 80.

An electric heater 84 may be provided in the tank 72. The battery pack 16 may be electrically connected to the heater 84 to provide electric power to the heater 84 via an electric circuit. Accordingly, on cold days, before the engine 12 is started, the battery pack 16 can be used to electrically heat the lubricant in the tank 72 to reduce oil viscosity and, thus, facilitate starting and reduce the engine starter size. A switch 86 may be provided in the electric circuit to selectively electrically power the heater 84.

Still referring to FIG. 1, it can be appreciated that the power plant 10 further comprises a coolant circuit 90. In a particular embodiment, the coolant circuit 90 can be provided in the form of a liquid coolant circuit in heat exchange relationship with the engine housing 32 in order to pick up waste heat from the internal combustion engine 23 (about 70% of the output power of the engine). As shown in FIG. 3, the liquid coolant circuit 90 may include coolant passages 64 extending through the walls of the engine housing 32. A pumping unit 92, which may include one pump or more, is strategically positioned in the coolant circuit 90 to move the liquid coolant in a continuous closed-loop cycle through the coolant circuit 90. In a particular embodiment, the engine coolant may be for example water, or water mixed with anti-freeze liquid(s), such as ethylene glycol. The same coolant circuit or a separate/distinct cooling circuit may be used to cool down the motor-generator 14.

Figure 4:
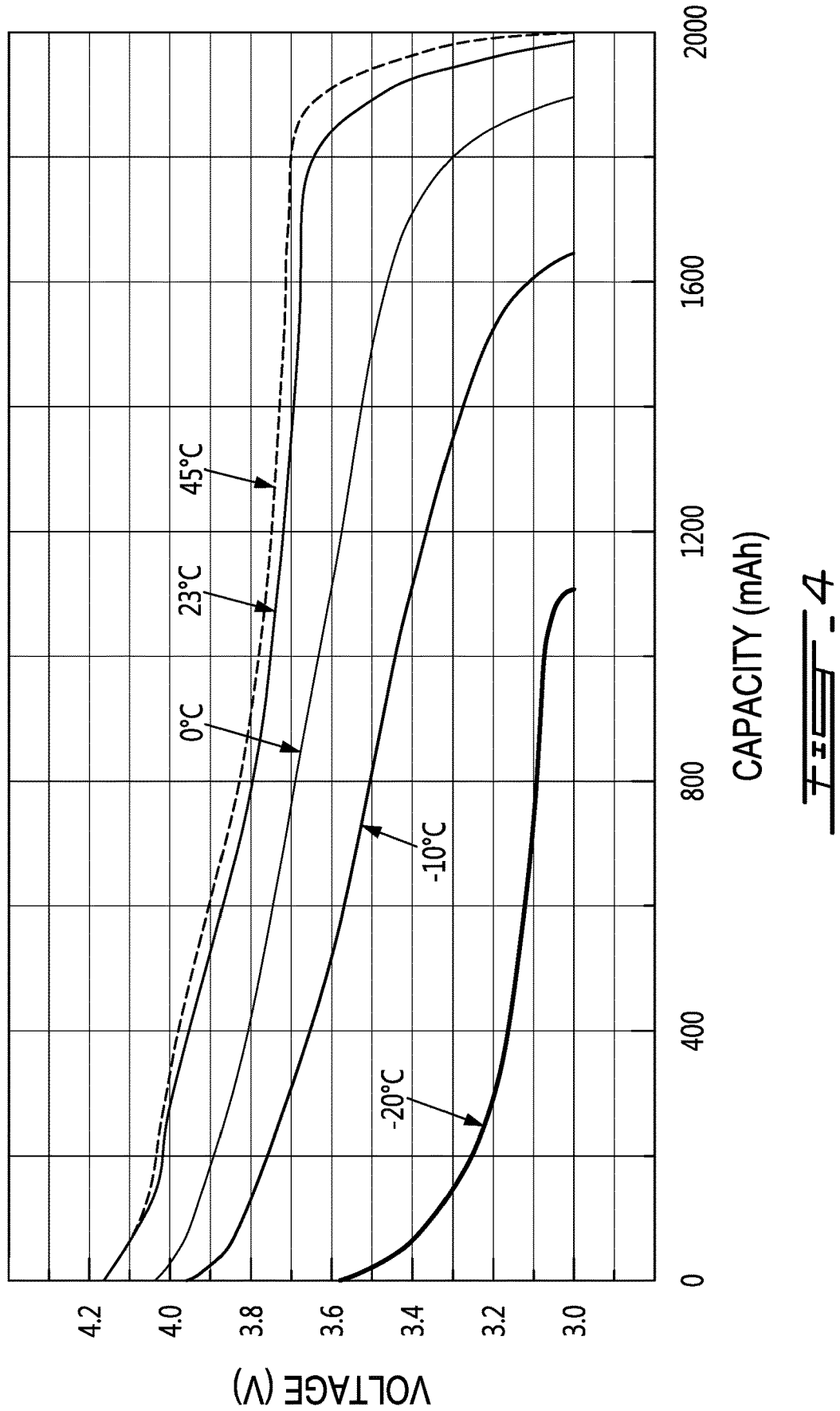
FIG. 4 shows typical characteristics of a Lithium-ion battery as a function of the ambient temperature.

The battery pack 16 can include various energy storage devices. For instance, the battery pack 16 may comprise any suitable combination of high power density batteries. For instance, the battery pack 16 may comprise one or more Lithium-ion or lead acid batteries. As mentioned hereinbefore, temperature plays an important role in the performance of electrolytic processes and, thus, on the performance of batteries. FIG. 4 shows typical characteristics of a Lithium-ion battery as a function of ambient temperature. In cold climates, like at −20 Celsius, the battery capacity and power reduces by about 50%. Therefore, on cold days, it is desirable to warm the battery pack 16 to improve the efficiency thereof. As the engine 12 comprises an internal combustion engine, it generates significant waste heat. It is herein proposed to use at least part of this waste heat to warm the batteries on cold days and, thus, preserve their power.

For instance, the waste heat picked up by the engine coolant and/or the engine lubricant while circulated through the internal combustion engine 23 could be used to preheat the battery pack 16 whenever the efficiency of the batteries is likely to be diminished by the environment temperature. For instance, as illustrated in FIG. 1, the coolant circuit 90 could be coiled around or otherwise connected in heat exchange relationship with the battery pack 16. A valve 94 can be provided in the coolant circuit 90 downstream of the internal combustion engine 23 to control the flow of warm coolant to the battery pack 16. The valve 94 could, for instance, be provided in the form of a three-way valve having one of its two outlets connected to a bypass branch 90*a* of the coolant circuit 90 for the warm coolant to selectively bypass the battery pack 16 when the same is within an appropriate range of operating temperatures. Still referring to FIG. 1, it can be appreciated that a heat exchanger 96 is provided in the coolant circuit 90 downstream of the battery pack 16 to further cool the coolant prior to being redirected into the internal combustion engine 23. The heat exchanger 96 can be integrated to the lubricant heat exchanger 80 or separate. In the embodiment illustrated in FIG. 1, the heat exchanger 96 is an air-liquid heat exchanger and the cooling air circulated through the heat exchanger 96 is drawn by the same blower 82 as the one used to generate a flow of air through the lubricant heat exchanger 80. Accordingly, both heat exchangers 80, 96 can be mounted in a same air conduit and fed with coolant air by a same blower 82 (or any other suitable air moving device).

In cold climates, the power plant 10 can be operated to first warm the lubricant with electric heater 84. Once the lubricant as the desired viscosity, the internal combustion engine 23 can be started and allowed to warm up. Once the engine 23 is warmed up, the temperature of the liquid coolant will typically range from about 150 degrees Fahrenheit to about 250 degrees Fahrenheit. The valve 94 can be operated to direct the warm engine coolant to the battery pack 16 to transfer waste heat picked up from the internal combustion engine 23 to the batteries of the battery pack 16, thereby increasing the capacity and power output of the batteries for take-off in cold environments. While the batteries are being warmed up, the internal combustion engine 23 can be operated to drive the motor-generator 14 to generate electrical power for charging the batteries. Thereafter, the warmed and charged batteries can be used to provide electric power to the electric-motor generator 14 to drive the propeller 18 alone or in combination with the compound cycle engine.

As mentioned hereinbefore, the warm lubricant circuit 74 can also be used to warm the batteries. This can be done to supplement the heat carried to the batteries by the engine coolant or in place thereof. The person skilled in the art will appreciated that various arrangements are possible to transfer the heat absorbed by the lubricant to the battery pack 16.

Conventional gas turbine engines have no coolant and very little heat available in the oil cooler, and nearly all the rejected heat is in the exhaust. Using the exhaust gas to warm the battery is more complicated as the exhaust is very hot (over 1000 degrees Fahrenheit) and ends up in heavier system. Accordingly, while the fossil-fuel powered engine 12 could be provided in the form of a conventional gas turbine engine, a person skilled in the art will appreciate that the compound cycle engine embodiment shown in FIG. 2 offers more synergy for hybrid electric aircraft applications than conventional gas turbine engines.

On hot days or whenever the batteries need to be cooled, the blower 82 of the engine coolant and lubricant systems can be used to direct cooling air over the battery pack 16. Also, a separate cooling circuit could be provided to remove heat from the battery pack 16.

Embodiments disclosed herein include:

A: A method of operating a hybrid electric power plant in cold climates, the hybrid electric power plant having an internal combustion engine, an electric motor and a battery pack, the method comprising: a) absorbing heat generated by the internal combustion engine, and b) using at least part of the heat absorbed from the internal combustion engine to warm the battery pack.

B: A method of operating a hybrid electric power plant of an aircraft in cold climates, the method comprising: starting an internal combustion engine, circulating a coolant in heat exchange relationship with the internal combustion engine to absorb waste heat generated by the internal combustion engine, circulating the coolant heated by internal combustion engine in heat exchange relationship with a battery pack, the coolant transferring heat to the battery pack to warm the battery pack, and then using the battery pack to power an electric motor.

C: A hybrid electric power plant comprising: a compressor; an internal combustion engine having an inlet fluidly connected to an outlet of the compressor, the internal combustion engine having a coolant circuit; a turbine having an inlet fluidly connected to an outlet of the internal combustion engine; an electric motor; and a battery pack configured to provide electric power to the electric motor, the battery pack in heat exchange relationship with the coolant circuit of the internal combustion engine.

Each of the embodiments, A, B and C may have one or more of the following additional elements in any combination: Element 1: circulating a coolant in heat exchange relationship with the internal combustion engine, and circulating the coolant heated by the internal combustion engine in heat exchange relationship with the battery pack. Element 2: circulating a liquid coolant through a housing of the internal combustion engine, and circulating the liquid coolant around the battery pack. Element 3: controlling the flow of coolant to the battery pack as a function of an environmental temperature. Element 4: causing at least part of the coolant heated by the internal combustion engine to bypass the battery pack when the environmental temperature is sufficiently warm to allow to the battery to be properly operated. Element 5: operating a valve in a coolant circuit between the internal combustion engine and the battery pack. Element 6: circulating the coolant through a heat exchanger to further cool the coolant downstream of the battery pack before re-circulating the coolant through the internal combustion engine. Element 7: directing a flow of cooling air through the heat exchanger to cool the coolant, and using said cooling air to cool the battery pack when it is determined that the battery pack needs to be cooled. Element 8: circulating a lubricant through a lubricant circuit extending through the internal combustion engine, and using heat absorbed from the internal combustion engine by the lubricant to warm the battery pack. Element 9, wherein the hybrid electric power plant further comprises a compressor and a turbine, and wherein the method further comprises turbocompounding the internal combustion engine. Element 10: using the battery pack to heat a lubricant of the internal combustion engine prior to starting the internal combustion engine, and using the battery pack to provide electrical power to the electric motor after warming up the batteries. Element 11: using a valve to control the flow of coolant from the internal combustion engine to the battery pack. Element 12: while the coolant heated by internal combustion engine is circulated in heat exchange relationship with the battery pack, using the internal combustion engine to drive a generator for charging the battery pack. Element 13: wherein a valve is positioned in the coolant circuit between the internal combustion engine and the battery pack, the valve having an outlet connected to a bypass line to selectively divert the coolant to bypass the battery pack. Element 13: wherein the internal combustion engine has a lubricant circuit, and wherein the lubricant circuit is in heat exchange relationship with the battery pack.

The above description is meant to be exemplary only, and one skilled in the art will recognize that changes may be made to the embodiments described without departing from the scope of the invention disclosed. Any modifications which fall within the scope of the present invention will be apparent to those skilled in the art, in light of a review of this disclosure, and such modifications are intended to fall within the appended claims.

The invention claimed is:

1. A method of operating a hybrid electric power plant, the hybrid electric power plant having an internal combustion engine, an electric motor and a battery pack, the method comprising: a) absorbing heat generated by the internal combustion engine, and b) using the heat absorbed from the internal combustion engine to warm the battery pack, comprising using the battery pack to heat a lubricant of the internal combustion engine prior to starting the internal combustion engine, and after b) using the battery pack to provide electrical power to the electric motor.

2. The method of claim 1, wherein a) comprises circulating a coolant in heat exchange relationship with the internal combustion engine, and wherein b) comprises circulating the coolant heated by the internal combustion engine in heat exchange relationship with the battery pack.

3. The method of claim 2, wherein a) further comprises circulating a liquid coolant through a housing of the internal combustion engine, and wherein circulating the coolant heated by the internal combustion engine in heat exchange relationship with the battery pack comprises circulating the liquid coolant around the battery pack.

4. The method of claim 2, wherein b) further comprises controlling the flow of coolant to the battery pack as a function of an environmental temperature.

5. The method of claim 4, comprising causing at least part of the coolant heated by the internal combustion engine to bypass the battery pack.

6. The method of claim 5, comprising operating a valve in a coolant circuit between the internal combustion engine and the battery pack.

7. The method of claim 2, further comprising circulating the coolant through a heat exchanger to further cool the coolant downstream of the battery pack before re-circulating the coolant through the internal combustion engine.

8. The method of claim 7, comprising directing a flow of cooling air through the heat exchanger to cool the coolant, and using said cooling air to cool the battery pack when it is determined that the battery pack needs to be cooled.

9. The method of claim 1, wherein b) comprises: circulating the lubricant through a lubricant circuit extending through the internal combustion engine, and using heat absorbed from the internal combustion engine by the lubricant to warm the battery pack.

10. The method of claim 1, wherein the hybrid electric power plant further comprises a compressor and a turbine, and wherein the method further comprises turbocompounding the internal combustion engine.

11. A method of operating a hybrid electric power plant of an aircraft in cold climates, the method comprising: starting an internal combustion engine, circulating a coolant in heat exchange relationship with the internal combustion engine to absorb waste heat generated by the internal combustion engine, circulating the coolant heated by internal combustion engine in heat exchange relationship with a battery pack, the coolant transferring heat to the battery pack to warm the battery pack, and then using the battery pack to power an electric motor, wherein the engine has a lubricant circuit containing a lubricant, and wherein the method further comprises using the battery pack to electrically heat the lubricant prior to starting the internal combustion engine.

12. The method of claim 11, comprising using a valve to control the flow of coolant from the internal combustion engine to the battery pack.

13. The method of claim 11, further comprising circulating a lubricant through a lubricant circuit extending through the internal combustion engine, and using heat picked up from the internal combustion engine by the lubricant to warm the battery pack.

14. The method of claim 11, comprising using the battery pack to provide electrical power to an oil heater of the lubricant circuit.

15. The method of claim 11, wherein while the coolant heated by internal combustion engine is circulated in heat exchange relationship with the battery pack, using the internal combustion engine to drive a generator for charging the battery pack.

* * * * *